US012635690B2

(12) United States Patent
Knesting

(10) Patent No.: US 12,635,690 B2
(45) Date of Patent: **\*May 26, 2026**

(54) DUAL ACTIVE INSECTICIDAL COMPOSITIONS

(71) Applicant: S. C. Johnson & Son, Inc., Racine, WI (US)

(72) Inventor: Kristina Marie Knesting, Racine, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,726

(22) Filed: Nov. 9, 2023

(65) Prior Publication Data

US 2024/0081330 A1      Mar. 14, 2024

Related U.S. Application Data

(60) Continuation of application No. 17/715,133, filed on Apr. 7, 2022, now Pat. No. 11,856,954, which is a division of application No. 16/442,818, filed on Jun. 17, 2019, now Pat. No. 11,297,836.

(51) Int. Cl.
| | |
|---|---|
| *A01N 43/50* | (2006.01) |
| *A01N 25/06* | (2006.01) |
| *A01N 25/16* | (2006.01) |
| *A01N 37/10* | (2006.01) |

(52) U.S. Cl.
CPC .............. *A01N 43/50* (2013.01); *A01N 25/06* (2013.01); *A01N 25/16* (2013.01); *A01N 37/10* (2013.01)

(58) Field of Classification Search
CPC ........ A01N 43/50; A01N 25/06; A01N 25/16; A01N 37/10
See application file for complete search history.

(56) References Cited

U.S. PATENT DOCUMENTS

| | | | |
|---|---|---|---|
| 3,246,850 | A | 4/1966 | Bourke |
| 5,385,303 | A | 1/1995 | Gosselin et al. |
| 5,773,016 | A | 6/1998 | Nelson |
| 5,849,264 | A | 12/1998 | Bassam et al. |
| 6,050,505 | A | 4/2000 | Ou |
| 6,531,144 | B2 | 3/2003 | Kashima et al. |
| 6,695,227 | B1 | 2/2004 | Hayashi et al. |
| 6,706,760 | B2 | 3/2004 | Matsunaga |
| 8,119,150 | B2 | 2/2012 | Tamarkin et al. |
| 8,178,078 | B2 | 5/2012 | Clark et al. |
| 8,333,982 | B2 | 12/2012 | Taranta et al. |
| 8,563,018 | B2 | 10/2013 | Burke |
| 8,568,688 | B2 | 10/2013 | Fujii et al. |
| 8,900,554 | B2 | 12/2014 | Tamarkin et al. |
| 8,940,662 | B2 | 1/2015 | Burke et al. |
| 8,980,294 | B2 | 3/2015 | Burke et al. |
| 9,044,414 | B2 | 6/2015 | Clark et al. |
| 9,339,030 | B2 | 5/2016 | Burke et al. |
| 9,364,007 | B2 | 6/2016 | Clark et al. |
| 2008/0317679 | A1 | 12/2008 | Tamarkin et al. |
| 2014/0205548 | A1 | 7/2014 | Yamada et al. |
| 2016/0302413 | A1 | 10/2016 | Bedoukian |
| 2017/0071186 | A1 | 3/2017 | Notomi et al. |
| 2018/0332854 | A1 | 11/2018 | Shah |

FOREIGN PATENT DOCUMENTS

| | | | | | |
|---|---|---|---|---|---|
| AU | 200027646 | * | 10/2000 | | |
| CN | 1399874 | A | 3/2003 | | |
| CN | 104430481 | A | 3/2015 | | |
| CN | 105432609 | B | 3/2016 | | |
| EP | 1661458 | A1 | 5/2006 | | |
| EP | 2184993 | B1 | 10/2011 | | |
| EP | 2829178 | A1 | 1/2015 | | |
| EP | 2227215 | B1 | 4/2017 | | |
| JP | 2006257050 | A | 9/2006 | | |
| JP | 2010163378 | A | 7/2010 | | |
| JP | 2010280633 | A | 12/2010 | | |
| JP | 2014019674 | A | 2/2014 | | |
| WO | WO2002056687 | * | 7/2002 | | |
| WO | 2006003481 | A2 | 1/2006 | | |
| WO | 2006111750 | A1 | 10/2006 | | |
| WO | 2009007785 | A2 | 1/2009 | | |
| WO | 2010084301 | A1 | 7/2010 | | |
| WO | WO-2011025789 | A2 | * | 3/2011 | .......... A01M 7/0046 |
| WO | 2017098210 | A1 | 6/2017 | | |

OTHER PUBLICATIONS

WO2002/056687. English translation.*
Lee, Entomological Research 37 (2007) 173-179 (Year: 2007).*
Senbo et al., Jpn. J. Environ. Entomul. Zool. 7(2) 79-86 (1995) (Year: 1995).*
International Search Report and Written Opinion issued in corresponding International Application No. PCT/US2020/033776, mailed Aug. 5, 2020, 10 pages.
Kangmei Chemical (Transfluthrin (Benfluthrin, Tetrafluthrin) C15H12CI2F4O2, CAS#118712-89-3, 2012, pp. 1-2).
Zhang, Pesticide Product Handbook, Transfluthrin, Shenyang Publishing House, Aug. 1999, pp. 349-350.

* cited by examiner

*Primary Examiner* — San Ming R Hui
(74) *Attorney, Agent, or Firm* — Quarles & Brady LLP

(57) ABSTRACT

An insecticidal composition is disclosed that contains an active ingredient and solvent. Further, the active ingredient is devoid of residual kill agents.

10 Claims, No Drawings

DUAL ACTIVE INSECTICIDAL COMPOSITIONS

CROSS REFERENCE TO RELATED APPLICATIONS

This application is a continuation of U.S. patent application Ser. No. 17/715,133, filed on Apr. 7, 2022, which is a divisional of U.S. patent application Ser. No. 16/442,818, filed on Jun. 17, 2019, now U.S. Pat. No. 11,297,836, both of which are incorporated in their entirety by reference herein.

REFERENCE REGARDING FEDERALLY SPONSORED RESEARCH OR DEVELOPMENT

Not applicable.

SEQUENCE LISTING

Not applicable.

BACKGROUND

1. Technology Field

The present disclosure relates to an insecticidal composition and, more particularly, to an aerosol insecticidal composition, that comprises at least two active ingredients and effectively knocks down and kills both flying and crawling insects.

2. Description of the Background

Insecticide has been used over the years to prevent insects from attacking humans, animals, and crops. Diseases transmitted by insects are a major health hazard. Insects (mosquitoes, flies, and the like) transmit a number of diseases caused by the exposure of the victim to infectious agents such as viruses (chikungunya virus, yellow fever, dengue fever, etc.), bacteria (Lyme disease, plague, etc.), and parasites (malaria, sleeping sickness, leishmaniasis, filariasis, etc.) carried by the insect.

For example, flying insects, such as mosquitoes, cause greater human suffering than any other organism—over one million people worldwide die from mosquito-borne diseases annually. Not only can mosquitoes carry diseases that afflict humans, they also transmit several diseases and parasites that affect other animals, such as dogs and horses. These include dog heartworm, West Nile virus (WNV), and Eastern equine encephalitis (EEE). In addition, mosquito bites may cause severe skin irritation resulting from an allergic reaction to the mosquito's saliva, causing inflammation and itching at the affected site, leading to the possible introduction of other disease-causing agents.

Crawling insects, such as ants and cockroaches, are responsible for health problems as well. Cockroaches in the home environment are a health hazard not only because of the risks posed by cockroach antigens to asthma sufferers, but also because they can carry disease-causing agents. Cockroaches may play a role as carriers of intestinal diseases, such as diarrhea, dysentery, typhoid fever and cholera.

Insecticide active ingredients (AIs) are typically categorized into three types: immediate knock-down (KD) (ie. instant action, but insect may recover); residual kill (eg. continues killing for some time period after application), and synergists which support or help deliver residual kill activity (eg. Piperonyl butoxide (PBO)). Known knockdown AIs include Prallethrin (ETOC), d-tetramethrin (Neo Pynamin Forte), Propoxur, Bendiocarb, Imiprothrin, Transfluthrin, and Metofluthrin. Known residual AIs include d-phenothrin (Sumithrin), Cypermethrin, Cyfluthrin, and Deltamethrin. Commercially available insecticides may also include synergists, which are used to provide a degree of residual activity to an insecticidal composition. Examples of known synergists include, but are not limited to, PBO and Pyrodone (MGK-264). What is needed in the industry is an insecticide composition that can provide speed of knock down and mortality without the use of an AI known for kill.

Therefore, it is desirable to have an insecticidal composition with the ability to knockdown and kill both flying and crawling insects in a quick and efficient manner in a single product without the need of a synergist. It is also desirable to reduce the number of AIs present in the insecticide.

SUMMARY

Embodiments of the current disclosure describe an insecticidal composition comprising transfluthrin and imiprothrin. Both transfluthrin and imiprothrin are considered to be AIs with knockdown capabilities, with each individually affording little to no insect mortality. In the present disclosure, Applicant demonstrates that a combination of these two immediate knockdown actives unexpectedly provides both immediate knockdown and lasting mortality.

In certain embodiments the transfluthrin is present at about 0.05% to about 0.5% by weight and the imiprothrin at about 0.01% to about 0.5% by weight. In certain embodiments, the transfluthrin is present at about 0.08% to about 0.1% by weight and the imiprothrin is present at about 0.03% and about 0.05% by weight. The insecticidal composition may be a water-based formulation or a hydrocarbon (HC) solvent-based formulation. The water-based formulation may also comprise a hydrocarbon solvent component.

An embodiment of the present disclosure is a composition for killing insects comprising transfluthrin, imiprothrin, and solvent. The composition comprises between about 0.05% to about 0.5% by weight of transfluthrin and between about 0.01% to about 0.5% by weight of imiprothrin. Certain embodiments comprise about 0.08 to about 0.1% by weight of transfluthrin, and between about 0.03% to about 0.05% by weight of imiprothrin.

In an embodiment, the solvent comprises about 50% to about 75% by weight water. In an embodiment the composition comprises about 7% to about 11% by weight hydrocarbon solvent, selected from the group consisting of aliphatic $C_9$-C17 hydrocarbons, alicyclic $C_9$-C17 hydrocarbons, naphtha, petroleum distillate, paraffins, iso-paraffins, isoparaffinic hydrocarbons, cycloparaffins, alkanes, iso-alkanes, cycloalkanes, and any combinations thereof. In an embodiment, the composition comprises one or more emulsifiers. In an embodiment, the composition comprises about 0.1% to about 2.0% by weight emulsifier.

In an embodiment, the solvent comprises about 25% to about 55% by weight hydrocarbon solvent, selected from the group consisting of aliphatic $C_9$-C17 hydrocarbons, alicyclic $C_9$-C17 hydrocarbons, naphtha, petroleum distillate, paraffins, iso-paraffins, isoparaffinic hydrocarbons, cycloparaffins, alkanes, iso-alkanes, cycloalkanes, and any combinations thereof. In an embodiment, the solvent is substantially anhydrous.

In an embodiment, the composition comprises a polar, organic solvent. In an embodiment, the composition comprises a polar, organic solvent at about 0.5% to about 5.0% by weight. In an embodiment, the polar, organic solvent is an alcohol. In an embodiment, the composition comprises a propellant, selected from the group consisting of methane, ethane, propane, pentane, isobutene, N-butane, isobutane, dimethyl ether, 1,1-difluoroethane, 1,1,1,2-tetrafluoroethane, carbon dioxide, nitrogen, air, and any combinations thereof. In an embodiment, the propellant is present in about 10% to about 80% by weight. In an embodiment, the formula composition is such that the composition is discharged as a foam.

An embodiment of the present disclosure is a composition for killing insects, comprising transfluthrin, imiprothrin, solvent, and propellant. In an embodiment, transfluthrin is about 0.05% to about 0.5% by weight, and imiprothrin is about 0.01% to about 0.5% by weight. In an embodiment, the composition comprises about 0.08% to about 0.1% by weight of transfluthrin, and between about 0.03% to about 0.05% by weight of imiprothrin. In an embodiment, the propellant is about 10% to about 80% by weight, selected from the group consisting of methane, ethane, propane, pentane, isobutene, N-butane, isobutane, dimethyl ether, 1,1-difluoroethane, 1,1,1,2-tetrafluoroethane, carbon dioxide, nitrogen, air, and any combinations thereof. In an embodiment, the formula composition is such that the composition is discharged as a foam.

In an embodiment, the solvent comprises about 50% to about 75% by weight water. In an embodiment, the composition comprises about 7% to about 11% by weight hydrocarbon solvent, selected from the group consisting of aliphatic $C_9$-C17 hydrocarbons, alicyclic $C_9$-C17 hydrocarbons, naphtha, petroleum distillate, paraffins, iso-paraffins, isoparaffinic hydrocarbons, cycloparaffins, alkanes, iso-alkanes, cycloalkanes, and any combinations thereof.

In an embodiment, the solvent comprises about 25% to about 55% by weight hydrocarbon solvent, selected from the group consisting of aliphatic $C_9$-C17 hydrocarbons, alicyclic $C_9$-C17 hydrocarbons, naphtha, petroleum distillate, paraffins, iso-paraffins, isoparaffinic hydrocarbons, cyclopraraffins, alkanes, iso-alkanes, cycloalkanes, and any combinations thereof. In an embodiment, the solvent is substantially anhydrous.

In an embodiment, the composition comprises a polar, organic solvent. In an embodiment, the polar, organic solvent is an alcohol.

An embodiment of the present disclosure is a composition for killing insects, comprising transfluthrin, imiprothrin, solvent, propellant, and a polar, organic solvent. In an embodiment, the composition comprises between about 0.05% and about 0.5% by weight of transfluthrin, between about 0.01% and about 0.5% by weight of imiprothrin, between about 25% and about 85% by weight of a solvent, and between about 10% and about 80% by weight of a propellant.

Certain embodiments comprise a method of killing insects, the method comprising providing an insecticidal composition as described herein in a dispenser which dispenses the composition at a rate of between about 1.5 gram/second and about 3.5 gram/second, and instructing a user to spray the composition for a duration of typically 8 to 12 seconds to fog a room for flying insects, and less than about 5 seconds for direct spray of crawling insects.

DETAILED DESCRIPTION OF THE INVENTION

An insecticidal composition designed to knockdown and kill both flying and crawling insects more effectively than other known compositions is presently disclosed. In the pest control field, it is known that households tend to suffer from both flying and crawling insects. Therefore, it is important to develop an insecticidal composition that can knockdown and kill both flying and crawling insects in a timely fashion. It has been found that an insecticidal composition comprising two actives primarily known for quick knockdown but not kill, may provide such a benefit.

The insecticidal composition according to an embodiment of the present disclosure is an AI package which can be used in a water-based formulation or in a HC solvent-based formulation. The two AIs used in this AI package, transfluthrin and imiprothrin, are considered to be good KD actives. However, unexpectedly, Applicants were able to achieve a combination of good knock-down and lasting mortality without the use of a synergist or a separate AI known to provide lasting mortality/kill benefits.

The insecticidal composition according to an embodiment of the present disclosure provides a reduced exposure to AIs in the composition. The insecticidal composition results in a beneficial 'minimalist' approach to achieving both KD and mortality together with a relatively low amount of AI. Other known commercially available insecticide composition must use three AIs or three AIs and a synergist to obtain this level of efficacy. As such, the insecticidal composition according to an embodiment of the present disclosure requires fewer AI and synergist components in its composition, resulting in an increase in desirability to the user.

In certain embodiments, the insecticidal composition comprises transfluthrin and imiprothrin. Transfluthrin is a fast-acting pyrethroid insecticide with low persistency. It has the molecular formula $C_{15}H_{12}Cl_2F_4O_2$. Imiprothrin is another pyrethroid insecticide, which has the molecular formula $C_{17}H_{22}N_2O_4$.

In determining a concentration of each of the AIs, the type of AIs, the spray rate of the composition, and the instructions regarding use of the composition are considered. In some embodiments, the spray rate of the AIs is in the range of about 1.0 grams per second to about 2.0 grams per second. In other embodiments, the spray rate of the AIs is in the range of about 2.0 grams per second to about 3.0 grams per second. In yet other embodiments, the spray rate of the AIs is in the range of about 3.0 grams per second to about 4.0 grams per second. In some embodiments, the spray rate of the AIs is in the range of about 1.5 grams per second to about 3.5 grams per second. In some embodiments the user instructions for aerosol compositions may instruct the user to spray for about 4 to about 12 seconds to fog a room for flying insects. In yet other embodiments, users are instructed to spray for about 7 to about 10 seconds. In some embodiments the user instructions may instruct the user to spray for less than about 2 seconds for a direct spray on a crawling insect. In some embodiments the user instructions do not specify a period of time to fog a room for flying insects or time duration for a direct spray on a crawling insect.

It is desirable to provide an insecticidal composition comprising a particular amount of AI reaching its best efficacy (ability to kill or knock down pests) when a certain spray rate and a certain amount of spray time (spray duration) are used. In certain embodiments, the transfluthrin is about 0.05% to about 0.5% by weight and the imiprothrin is about 0.01% to about 0.5% by weight. In certain embodiments the transfluthrin is about 0.08% to about 0.1% by weight and the imiprothrin is about 0.03% to about 0.05% by weight. In accordance with an exemplary embodiment, the transfluthrin is about 0.1% by weight and the imiprothrin is about 0.03% to about 0.05% by weight. In some embodiments, the particular weight percentage may vary and the weight percentage of each component is at least about 0.01%, or less than or equal to about 0.1%, or greater than or equal to about 0.03%. While specific values chosen for this embodiment are recited, it is to be understood that, within the scope of the disclosure, the concentrations of all the AIs may vary to suit different applications. The concentration ranges of AIs are associated not only with the type of AI, but with spray rate and instructions for use, including, but not limited to, spray duration and/or recommended proximity to the pest. The insecticide compositions of the present invention may be in a water-based composition or a HC solvent-based composition.

In certain embodiments, the insecticide composition is a water-based composition including transfluthrin, imiprothrin, and water. In certain embodiments, the water is present at about 10% to about 90% by weight, preferably, about 40% to about 85% by weight. In a preferred embodiment, the water is present in about 50% to about 75% by weight. In certain embodiments, the water-based composition additionally includes a hydrocarbon solvent. In certain embodiments, the hydrocarbon solvent in the water-based composition is a water-miscible solvent. In certain embodiments, the hydrocarbon solvent is present in the water-based composition at about 1% to about 20% by weight. In certain embodiments, the hydrocarbon solvent is present in the water-based composition at about 5% to about 15% by weight. In certain embodiments, the hydrocarbon solvent is present in the water-based composition at about 7% to about 11% by weight. In a preferred embodiment, the hydrocarbon solvent is present in about 8% to about 10% by weight. In certain embodiments of the insecticide composition, the water-based composition additionally includes a polar, organic solvent. In certain embodiments, the polar, organic solvent is present at about 0.5% to about 5% by weight. In a preferred embodiment, the polar, organic solvent is present in about 1% to about 2% by weight. The polar, organic solvent may be an alcohol-based solvent. The alcohol-based solvent may include, but is not limited to, methanol, ethanol, isopropanol, propanol, butanol, and the like. In addition, solvents such as, but not limited to, ketones, glycols, glycol esters, and esters, for example isopropyl myristate, and the like, may be used. In certain embodiments of the insecticide composition, the water-based composition additionally includes one or more emulsifiers present in up to about 2.0% by weight. In some embodiments the one or more emulsifiers are present at about 0.1 to about 2.0% by weight. In a preferred embodiment, the one or more emulsifiers are present in about 0.5 to about 1.0% by weight. The emulsifiers may include, but are not limited to, sorbitan stearates, glyceryl monooleates, lecithin, lanolin alcohols, cetearyl alcohol, polysorbates, sorbitan laurate, amphoteric and anionic surfactants, and nonionic alkyl polyglucosides. In certain embodiments of the insecticide composition, the water-based composition additionally comprises one or more corrosion inhibitors, or corrosion inhibition system.

In certain embodiments, the insecticide composition is a substantially anhydrous HC solvent-based composition including transfluthrin, imiprothrin, and hydrocarbons as the primary solvent. In certain embodiments, the HC solvent is present at about 10% to about 90% by weight. In certain embodiments, the HC solvent is present at about 20% to about 75% by weight. In a preferred embodiment, the HC solvent is present in about 25% to about 55% by weight. In certain embodiments of the insecticide composition, the HC solvent-based composition additionally includes a polar, organic solvent. In certain embodiments, the polar, organic solvent is present at about 0.5% to about 5% by weight. In a preferred embodiment, the polar, organic solvent is present in about 1% to about 2% by weight. The polar, organic solvent may be an alcohol-based solvent. The alcohol-based solvent may include, but is not limited to, methanol, ethanol, isopropanol, propanol, butanol and the like. In addition, solvents such as, but not limited to, ketones, glycols, glycol esters, and esters, for example isopropyl myristate, and the like. In certain embodiments of the insecticide composition, the hydrocarbon solvent-based composition additionally includes one or more emulsifiers. The emulsifiers may include, but are not limited to, sorbitan stearates, glyceryl monooleates, lecithin, lanolin alcohols, cetearyl alcohol, polysorbates, sorbitan laurate, sorbitan monooleate, sorbitan monostearate, sorbitan monopalmitate, amphoteric and anionic surfactants, and nonionic alkyl polyglucosides. In certain embodiments of the insecticide composition, the hydrocarbon solvent-based composition additionally comprises one or more corrosion inhibitors, or a corrosion inhibition system.

While specific values of the solvents are chosen for these embodiments, it is to be understood that, within the scope of the disclosure, this value may vary over wide ranges to suit different applications. For example, the weight percentage of the solvent may increase to dissolve the AIs when, for example, there are additional AIs in one composition formula compared to another. The weight percentage of the solvent is balanced to effectively dissolve the AIs and effectively penetrate the cuticles of insects.

In certain embodiments, the solvent may be aliphatic $C_9$-$C_{17}$ hydrocarbons, alicyclic $C_9$-$C_{17}$ hydrocarbons, naphtha, petroleum distillate, paraffins, iso-paraffins, isoparaffinic hydrocarbons, cycloparaffins, alkanes, iso-alkanes, cycloalkanes, and the like, and any combinations thereof. In certain embodiments the solvent is a petroleum distillate. In certain embodiments the petroleum distillate is comprised of hydrocarbons, $C_{11}$-$C_{17}$, n-alkanes, isoalkanes, cyclics, <2% aromatics. In certain embodiments the solvent is an isoparaffinic hydrocarbon. In certain embodiments the isoparaffinic hydrocarbon is naphtha (petroleum), hydrotreated heavy. In certain embodiments the solvent is comprised of a petroleum distillate or an isoparaffinic hydrocarbon or both. Certain embodiments may comprise at least two solvents. In certain embodiments the molar ratio of the at least two solvents may be in the range of about 1:1 to about 1:100 or about 100:1 to about 1:1 based on the total concentration of the solvents. In certain embodiments the solvent is present at an appropriate amount to dissolve the AIs, and may also contribute to carrier efficiency, which is defined as the degree to which a solvent induces penetration of an insecticide into the pest.

Petroleum distillates are commonly used to refer to aliphatic hydrocarbons, defined to also include natural or synthetic paraffinic hydrocarbons. Petroleum distillates may include mineral spirits, kerosene, white spirits, naphtha, Stoddard solvents, and the like. These products may contain trace amounts of benzene and/or other aromatics. Notwithstanding the non-limiting examples provided herein for solvents, other solvents, such as acetone, butyl glycol, carbon tetrachloride, chloroform, chloropenthane, cresol, cyclohexanol, cyclohexanone, dibromomethane, 1,2-dichlorobenzene, 1,1-dichloroethane, 1,2-dichloroethane, dichloroethylene, 1,1-dichloroethylene, 1,2-dichloropropane, diethylbenzene, dimethyl carbonate, N,N-dimethylformamide, 1,4-dioxane, ethylbenzene, ethylene glycol, ethyl glycol, formol, furfuryl alcohol, isophorone, isopropyl glycol, kerosene, mesithyl oxide, mesithylene, methanol, 2-methoxypropanol, methylmetacrylate, methylcyclohexanol, methylcyclohexanone, methyl glycol, methylisobuthyl-carbinole, N-methylpyralidone, monochlorobenzene, nitrile acetic acid, nitrobenzene, 1-nitropropane, 2-nitropropane, oil of turpentine, o-chlorotoluene, pentachloroethane, phenol, propylbenzene, propylbromide, propyl chloride, propylene glycol, pyridine, styrene, tetrabenzylphenol, 1,1,2,2-tetrachloroethane, tetrachloroethylene, tetrahydrofuran, tetrahydronaphthalene, toluene, 1,1,1-trichloroethane, 1,1,2-trichloroethane, trichloroethylene, trimethylbenzene, vinyl-toluene, xylene, and the like, or any combinations thereof, can also be used as the solvent.

In certain embodiments, the insecticidal composition further comprises a propellant. In other embodiments, the insecticidal composition may further comprise a fragrance. Such embodiments may comprise a fragrance at about 0.1% to about 2% by weight. In accordance with certain embodiments of the present disclosure, the insecticidal composition is an aerosol insecticidal composition, which is suitable for industrial and domestic applications. An embodiment comprises a dispensing container having aerosol dispensing means, at least two AIs, a solvent at a sufficient weight percentage to dissolve the AIs, and a propellant gas at a sufficient pressure to dispense the AIs dissolved in the solvent from the dispensing means as an aerosol. An aerosol insecticidal composition is ideal for use against both flying and crawling insects. For example, the aerosol composition may be sprayed in the air for any flying insect and may be sprayed in the air for preventative measures. For crawling insects, the aerosol composition may be sprayed directly on the insect.

The propellant pressurizes the aerosol container and influences the form in which the insecticidal composition is discharged. The composition may be discharged in the form of foam, stream, or spray. The pressure normally created by the propellant is about 2.4 to about 9.7 bars (35 psi to 140 psi) at 21.1° C. If propellant concentration is increased, the spray composition may be effected. By adjusting the propellant, surfactants, and solvent used, quick breaking foams can be produced, or foams can be created that remain visually unchanged for days. To produce a spray, the propellant must have sufficient dispersive energy to overcome the surface tension of the liquid mixture, plus the cohesive and adhesive forces. For producing an aerosol product composition, vapor pressure, spray characteristics, solubility, flammability, and corrosion are considered.

Aerosol propellants may comprise compressed gases, soluble gases, and liquefied gases. Many of these forms of aerosol propellants may be used in connection with the present disclosure. In some embodiments the propellant may be carbon dioxide, nitrogen, air, and the like, or any combinations thereof. In some embodiments, the propellant belongs to the liquefied gases category including, but not limited to hydrocarbon propellants. In certain embodiments, the propellant may be methane, ethane, propane, pentane, isobutene, N-butane, iso-butane, dimethyl ether, 1,1-difluoroethane, 1,1,1,2-tetrafluoroethane and the like, and any combinations of two or more thereof. In some embodiments, the propellant is propane. In other embodiments, the propellant is butane, including both N-butane and iso-butane.

Some embodiments may comprise at least a first propellant and a second propellant. In some embodiments the first and second propellants are in a molar ratio in the range of about 1:1 to about 100:1, or about 100:1 to about 1:1 based on the total concentration of the first and second propellant. In certain embodiments the first propellant is propane and the second propellant is butane, including both N-butane and iso-butane.

Further, in certain embodiments, the propellant is present in about 0.5% to about 90% by weight, more preferably, about 10% to about 80% by weight. In one embodiment of the HC solvent-based composition, the propellant is present in about 50% to about 70% by weight, more preferably, about 65% to about 70% by weight. In one embodiment of the water-based-composition, the propellant is present in about 15% to about 40% by weight, more preferably about 34% to about 38% by weight. In one embodiment, the formula composition is such that the composition is discharged as a foam. While specific values chosen for the propellant are recited, it is to be understood that, within the scope of the disclosure, the value of this parameter may vary over wide ranges to suit different applications.

According to EPA standards, a "dead" (or killed) insect must be an insect with absolutely no movement, no twitching, no antenna moving, etc. A dead insect is probed or subjected to other stimuli to verify lack of movement. A "knockdown" of an insect is considered to be any condition between dead and full mobility, i.e., knockdown is often measured as the insect's inability to respond to a stimulus such as light or touch. For mosquitos, knockdown is defined as mosquitoes resting on the floor of the chamber and experiencing some aberrant behavior, such as on laying on their back or side, spinning erratically in one spot, or the inability to sustain normal flight more than a few inches giving an impression of hopping. Especially when actual mortality rate may be difficult to assess, knockdown is used to measure the effect of a pesticide. It is desirable to not only knockdown, but to kill insects to avoid the breeding of knockdown resistant insects. Knockdown resistance ("kdr"), describes cases of resistance to diphenylethane (e.g. DDT) and pyrethroid insecticides in insects and other arthropods that result from reduced sensitivity of the nervous system caused by point mutations in the insect's genetic makeup. Such mutative resistance is characterized by the presence of kdr alleles in the insect's genome. Knockdown resistance remains a threat to the continued usefulness of pyrethroids in the control of many pest species. As such, it is desirable to have an insecticidal composition capable of not only insect knockdown but also insect death.

The currently disclosed insecticidal composition exhibits faster and higher knockdown rates and higher killing rates against flying insects and crawling insects compared to other tested compositions. Other compositions, including other commercially available compositions, may have only fast and high knockdown rates against either flying insects or crawling insects, but not both. Furthermore, the disclosed insecticidal compositions also exhibit insect mortality and demonstrated activity in killing flying and crawling insects after the composition is applied. Other known compositions require the addition of a residual active agent or a synergist to ensure insect mortality. The currently disclosed insecticidal composition provides fast knockdown and insect mortality without the addition of a residual active agent or a synergist.

Any of the embodiments described herein may be modified to include any of the structures, compositions, or methodologies disclosed in connection with different embodiments.

EXAMPLES

Formulations A, B, C, and D (Examples 1-4) are water-based formulations and comprise about 0.1% transfluthrin; either about 0.03% or about 0.05% imiprothrin; about 69% to about 70% water; about 19% propellant; about 8% to about 9% $C_{11}$-$C_{13}$ branched alkanes; about 1% to about 2% isopropyl alcohol; about 0.7% emulsifier; and about 0.46% corrosion inhibitor.

Formulations F, G, and H (Example 5) are HC solvent-based formulations and comprise either about 0.08% or and 0.05% Imiprothrin) and C (comprising 0.1% Transfluthrin and 0.03% Imiprothrin) perform equally as well as, if not better than, the other tested compositions comprising Prallethrin and d-Phenothrin, or requiring the presence of piperonyl butoxide (PBO) in the percent knockdown of *Blatella germanica* (German cockroach).

TABLE 1

| Cockroach (*Blatella germanica*) Direct Spray Knockdown Test[1]. 1 Second Spray, 5 Reps, 10 Insects/Rep. | | | | | | | | | | | | | |
|---|---|---|---|---|---|---|---|---|---|---|---|---|---|
| | | Mean % Knockdown_Seconds | | | | | | | | | | 24 H % | Mean KT100 |
| Treatment | Dosage | 15 | 30 | 45 | 60 | 75 | 90 | 105 | 120 | 135 | 150 | Mortality | In Seconds |
| Composition A 0.1% Prallethrin 0.125% d-Phenothrin | 3.08 g | 10c | 42c | 68b | 86b | 92a | 98a | 98a | 100a | 100a | 100a | 100a | 78b |
| Composition B 0.1% Transfluthrin 0.05% Imiprothrin | 3.13 g | 54ab | 94ab | 100a | 100a | 100a | 100a | 100a | 100a | 100a | 100a | 100a | 31a |
| Composition C 0.1% Transfluthrin 0.03% Imiprothrin | 3.09 g | 46b | 80b | 98a | 100a | 100a | 100a | 100a | 100a | 100a | 100a | 100a | 41a |
| Composition D 0.1% Transfluthrin 0.03% Imiprothrin 0.4% PBO | 3.04 g | 36b | 88ab | 96a | 100a | 100a | 100a | 100a | 100a | 100a | 100a | 100a | 39a |

[1]Means within columns with the same letter are not significantly different; (P = 0.05) All Pairs Tukey-Kramer.

0.1% transfluthrin; about 0.03% imiprothrin; about 50% propellant; about 47% to about 49% $C_{11}$-$C_{13}$ hydrocarbons, n-alkanes, isoalkane; and about 1% to about 2% isopropyl alcohol. Formulation E is similar to formulations F, G, and H, except formulation E contains the AIs 0.03% Prallethrin, 0.03% Imiprothrin, and 0.1% Cypermethrin, but does not contain transfluthrin.

Formulations I and J are HC solvent-based formulations comprising 0.15% esbiothrin, 0.04% transfluthrin, and 0.11% D-phenothrin (I); or 0.3% D-tetramethrin, 0.1% permethrin, and 0.1% D-phenothrin (J).

Example 1

Adult male German cockroach (7 weeks from eclosion) testing consists of five replicates per sample. German cockroach preparation for testing consists of anesthetizing the cockroaches with $CO_2$, sorting and placing in clean greased Tri-State 15-A plastic cups. Immediately prior to testing, German cockroaches were transferred into clean greased Lucite rings (5 cm height×10 cm diameter) with a stainless steel screen (6×7 mesh/cm 2) attached to the bottom of the ring. Cockroaches were allowed to recover from $CO_2$ overnight. No food or water is provided during the recovery period. Following preparation and recovery, cockroach-testing containers (one at a time) were placed in the CSMA Spray Tower and exposed to a targeted discharge at a spray distance of 46 cm (18"). After each aerosol discharge, the cockroaches were immediately transferred to a clean greased glass battery jar (15 cm height×15 cm diameter) for the selected observation period. One 15.0 cm diameter #2 filter paper was placed in bottom of glass battery jar for each replicate conducted. After observation period was completed, insects were removed from glass battery jars with the use of $CO_2$ (if necessary) and placed in 240 ml plastic cylinders and held for 24-hour mortality counts. Five additional replicates were held as untreated controls. Each replicate was timed to 100% knockdown to provide comparative data. Compositions B (comprising 0.1% Transfluthrin

Example 2

Housefly (*Musca domestica*) testing consists of five replicates per sample. Preparation for testing consists of anesthetizing the flies with $CO_2$, sorting, and placing in clean sealrite containers. Flies were allowed to recover from $CO_2$ overnight. Sugar water is provided during the recovery period. Following preparation and recovery, fly-testing containers (one at a time) were placed in the CSMA Spray Tower and exposed to a targeted discharge. After each aerosol discharge, knockdown counts were taken for the selected observation period. The results are not significantly different between Compositions B and C of the present disclosure versus the other tested compositions comprising Prallethrin and d-Phenothrin, or requiring the presence of piperonyl butoxide (PBO). Exposure to Compositions B and C result in a mean percent knockdown in 10 seconds of 90% and 74%, respectively, in the house fly (*Musca domestica*).

TABLE 2

| House Fly (*Musca domestica*) Direct Spray Knockdown Test[1]. 1 Second Spray, 5 Reps, 10 Insects/Rep. | | | | | | | |
|---|---|---|---|---|---|---|---|
| | | Mean % Knockdown_Seconds | | | | | |
| Treatment | Dosage | 10 | 20 | 30 | 40 | 50 | 60 |
| Composition A 0.1% Prallethrin 0.125% d-Phenothrin | 3.31 g | 78a | 100a | 100a | 100a | 100a | 100a |
| Composition B 0.1% Transfluthrin 0.05% Imiprothrin | 3.26 g | 90a | 100a | 100a | 100a | 100a | 100a |
| Composition C 0.1% Transfluthrin 0.03% Imiprothrin | 3.31 g | 74a | 100a | 100a | 100a | 100a | 100a |
| Composition D 0.1% Transfluthrin 0.03% Imiprothrin 0.4% PBO | 3.31 g | 78a | 100a | 100a | 100a | 100a | 100a |

[1]Means within columns with the same letter are not significantly different; (P = 0.05) All Pairs Tukey-Kramer.

Example 3

Mosquito testing consists of three replicates per sample. Preparation for testing consists of vacuuming mosquitoes from test cage with a tubular aspirator and placing in clean 240 ml (0.5 pt) cardboard cylinders with fitted aluminum screen ($6\times7$ mesh/cm$^2$) inserted in top. Following preparation, mosquitoes are released into test chamber from one of the portholes located in the chamber. Following a 1-minute acclimation period, mosquitoes are exposed to a targeted discharge. After each exposure/discharge knockdown counts are taken at 2-minute intervals over 12 minutes post-initial exposure. At 2 minutes, Compositions B (comprising 0.1% Transfluthrin and 0.05% Imiprothrin) and C (comprising 0.1% Transfluthrin and 0.03% Imiprothrin) have a faster and higher knockdown rate of the Southern House Mosquito (*Culex quinquefasciatus*) over any of the other tested compositions. With respect to predicted KT50 and KT90 knockdown times, Compositions B (comprising 0.1% Transfluthrin and 0.05% Imiprothrin) and C (comprising 0.1% Transfluthrin and 0.03% Imiprothrin) perform equally as well as, if not better than, the other tested compositions comprising Prallethrin and d-Phenothrin, or requiring the presence of piperonyl butoxide (PBO) in the percent knockdown of Southern House Mosquito.

TABLE 3

Mosquito (*Culex quinquefasciatus*) Free Flying Knockdown Test[1].
Equal Weight Dose: 0.65 Gram.

| Treatment | Mean % Knockdown_Minutes | | | | | |
|---|---|---|---|---|---|---|
| | 2 | 4 | 6 | 8 | 10 | 12 |
| Composition A 0.1% Prallethrin 0.125% d-Phenothrin | 10a | 43a | 68a | 77a | 84a | 89a |
| Composition B 0.1% Transfluthrin 0.05% Imiprothrin | 23a | 44a | 64a | 75a | 86a | 92a |
| Composition C 0.1% Transfluthrin 0.03% Imiprothrin | 27a | 48a | 71a | 81a | 86a | 94a |
| Composition D 0.1% Transfluthrin 0.03% Imiprothrin 0.4% PBO | 13a | 36a | 56a | 76a | 84a | 90a |

TABLE 3a

*Culex quinquefasciatus* Peet-Grady Testing (0.65 gram dosage, 3 replicates). Predicted KT50 and KT90 Values in Minutes based on Gompertz 3P Fit Curve Inverse Prediction (Alpha 0.05).

| Treatment | Specified % Knockdown (KT) | Predicted Time (min) | Specified % Knockdown (KT) | Predicted Time (min) |
|---|---|---|---|---|
| Composition A 0.1% Prallethrin 0.125% d-Phenothrin | 50 | 4.5ab | 90 | N/A |
| Composition B 0.1% Transfluthrin 0.05% Imiprothrin | 50 | 4.6ab | 90 | 11.7a |
| Composition C 0.1% Transfluthrin 0.03% Imiprothrin | 50 | 4.1a | 90 | 10.6a |
| Composition D 0.1% Transfluthrin 0.03% Imiprothrin 0.4% PBO | 50 | 5.2ab | 90 | 11.8a |

Fit Curve Model Comparison conducted with Gompertz 3P providing the best fit. Predicted values for the formulas at a specified % knockdown value with overlapping confidence limits are not considered to be significantly different.

Example 4

For efficacy tests in a Peet-Grady Chamber, the aerosol was sprayed through the upper port along the side wall of the chamber containing insects (*Culex pipiens pallens, Aedes albopictus, Musca domestica*). While testing aerosol against mosquitoes, knockdown counts were recorded at 2, 4, 6, 8 and 10 minute time intervals, then collected the knockdown mosquitoes and the remaining mosquitoes after 10 minutes as to check for 24 hour mortality and determined the total number of mosquitoes. While testing aerosol against house flies, knockdown counts were recorded at 3, 5, 10 and 15 minute time intervals, then collected the knockdown house flies and the remaining house flies after 15 minutes to check the 24 hour mortality and determined the total number of house flies.

For Direct Spray knockdown tests, the spray distance was 46 cm (18") and the targeted discharge was approximately 1.0 second. The knockdown counts for German cockroaches (*Blattella germanica*) were recorded at time intervals of 15 s, 30 s, 45 s, 60 s, 75 s, 90 s, 105 s, 120 s, 135 s, and 150 s, the knockdown counts for American cockroaches (*Periplaneta americana*) were recorded at time intervals of 15 s, 30 s, 45 s, 60 s, 75 s, 90 s, 105 s, 120 s, 180 s, 240 s, and 300 s, the knockdown counts for House flies (*Musca domestica*) were recorded at time intervals of 10 s, 20 s, 30 s, 40 s, 50 s, and 60 s, or end up observing time to 100% knockdown. At the end of the observation period, cockroaches (*Blattella germanica, Periplaneta americana*) and House flies (*Musca domestica*) were removed to check the 24 hour mortality.

Table 4a illustrates that Composition G (0.1% Transfluthrin and 0.03% Imiprothrin) demonstrates a percent knockdown of the common or Northern House Mosquito (*Culex pipiens pallens*) at 2 minutes at least double that of the other tested compositions, except for the composition containing the combination of esbiothrin and D-phenothrin. For the Asian tiger mosquito or forest mosquito (*Aedes albopictus*) percent knockdown is comparable if not better than the other compositions tested. For housefly (*Musca domestica*), as shown in Table 4b, percent knockdown is comparable if not better than the other compositions tested, except for those containing 0.3% D-tetramethrin, 0.1% permethrin, and 0.1% D-phenothrin. The KT50, KT90, and % mortality in 24 hours of Composition G was comparable to that of the other compositions tested, indicating that Composition G not only demonstrates good knock down activity but also good mortality in the two AI package containing AIs known primarily for good KD activity.

Tables 4c, 4d, and 4e, German cockroach (*Blattella germanica*), American cockroach (*Periplaneta Americana*), and housefly (*Musca domestica*), respectively, provide results (% knockdown, %24 h mortality, sprayed dose) of aerosol. As can be seen, Composition G demonstrates comparable, if not better, performance in % knockdown and % mortality measured at 24 hours. Composition G provides both knock down and mortality at 24 hours (residual effect) without the need for a residual active or a synergist such as PBO.

TABLE 4a

Mean test results (% knockdown, KT50, KT90, % 24 h mortality, sprayed dose) of aerosol against *Culex pipiens pallens* and *Aedes albopictus* in Peet-Grady Chamber.

| Test Composition | Test species | % knockdown after minutes | | | | | KT50 in Minutes | 95% Confidence Limits of KT50 | KT90 in Minutes | 95% Confidence Limits of KT90 | % 24 Hours Mortality | Sprayed Dose in grams |
|---|---|---|---|---|---|---|---|---|---|---|---|---|
| | | 2 | 4 | 6 | 8 | 10 | | | | | | |
| Composition E 0.03% Prallethrin 0.03% Imiprothrin 0.1% Cypermethrin | *Culex pipiens pallens* | 4.0 | 6.7 | 10.4 | 15.7 | 25.1 | 30.92 | 16.48-315.59 | 193.98 | 53.46-27288.04 | 25.1 | 1.02 |
| Composition F 0.1% Transfluthrin 0.03% Imiprothrin 0.4% PBO | | 6.6 | 22.9 | 40.2 | 62.1 | 76.4 | 6.51 | 5.69-7.56 | 16.11 | 12.54-24.69 | 76.4 | 1.02 |
| Composition G 0.1% Transfluthrin 0.03% Imiprothrin | | 14.5 | 43.6 | 70.0 | 83.8 | 87.8 | 4.26 | 4.04-4.49 | 10.37 | 9.59-11.35 | 87.5 | 0.93 |
| Composition H 0.08% Transfluthrin 0.03% Imiprothrin | | 6.6 | 38.3 | 71.3 | 84.5 | 90.8 | 4.60 | 4.40-4.80 | 9.34 | 8.79-10.01 | 84.8 | 0.99 |
| Composition I 0.15% esbiothrin 0.04% transfluthrin 0.11% D-phenothrin | | 21.3 | 50.5 | 66.2 | 77.0 | 87.2 | 4.02 | 3.76-4.28 | 12.23 | 11.02-13.87 | 81.6 | 1.01 |
| Composition J 0.3% D-tetramethrin 0.1% permethrin 0.1% D-phenothrin | | 11.6 | 20.5 | 25.7 | 28.1 | 32.3 | 27.79 | 18.80-55.95 | No Data | No Data | 32.3 | 0.95 |
| Composition E 0.03% Prallethrin 0.03% Imiprothrin 0.1% Cypermethrin | *Aedes albopictus* | 4.7 | 8.7 | 20.4 | 38.8 | 52.5 | 10.35 | 7.94-20.36 | 29.46 | 16.62-199.66 | 52.5 | 1.05 |
| Composition F 0.1% Transfluthrin 0.03% Imiprothrin 0.4% PBO | | 9.7 | 30.0 | 62.7 | 82.3 | 95.7 | 4.78 | 3.74-5.84 | 9.67 | 7.58-15.70 | 95.7 | 0.98 |
| Composition G 0.1% Transfluthrin 0.03% Imiprothrin | | 16.6 | 60.6 | 85.4 | 92.7 | 98.0 | 3.43 | 3.25-3.59 | 6.93 | 6.55-7.39 | 98.0 | 1.00 |
| Composition H 0.08% Transfluthrin 0.03% Imiprothrin | | 19.7 | 45.7 | 69.7 | 82.7 | 93.3 | 3.99 | 3.34-4.60 | 9.99 | 8.21-13.53 | 93.3 | 0.99 |

TABLE 4a-continued

Mean test results (% knockdown, KT50, KT90, % 24 h mortality, sprayed dose) of aerosol against *Culex pipiens pallens* and *Aedes albopictus* in Peet-Grady Chamber.

| Test Composition | Test species | % knockdown after minutes | | | | | KT50 in Minutes | 95% Confidence Limits of KT50 | KT90 in Minutes | 95% Confidence Limits of KT90 | % 24 Hours Mortality | Sprayed Dose in grams |
|---|---|---|---|---|---|---|---|---|---|---|---|---|
| | | 2 | 4 | 6 | 8 | 10 | | | | | | |
| Composition I 0.15% esbiothrin 0.04% transfluthrin 0.11% D-phenothrin | | 18.0 | 49.0 | 68.7 | 78.7 | 88.7 | 4.10 | 3.85-4.34 | 11.15 | 10.18-12.41 | 88.7 | 0.98 |
| Composition J 0.3% D-tetramethrin 0.1% permethrin 0.1% D-phenothrin | | 10.3 | 18.5 | 21.9 | 25.8 | 28.8 | 36.41 | 22.71-88.73 | 736.93 | 225.58-7212.95 | 28.8 | 1.01 |

Method: Aerosol test method in Peet-Grady Chamber; Approximately 100 free flying female mosquitoes per replicate TABLE 4b Mean test results (% knockdown, KT50, KT90, % 24 h mortality, sprayed dose) of aerosol against *Musca domestica* in Peet-Grady Chamber.

| Test Composition | Test species | % knockdown after minutes | | | | KT50 in Minutes | 95% Confidence Limits of KT50 | KT90 in Minutes | 95% Confidence Limits of KT90 | % 24 Hours Mortality | Sprayed Dose in grams |
|---|---|---|---|---|---|---|---|---|---|---|---|
| | | 3 | 5 | 10 | 15 | | | | | | |
| Composition E 0.03% Prallethrin 0.03% Imiprothrin 0.1% Cypermethrin | *Musca domestica* | 2.8 | 12.7 | 38.6 | 58.4 | 12.58 | 11.99-13.26 | 34.25 | 30.78-38.77 | 57.8 | 0.99 |
| Composition F 0.1% Transfluthrin 0.03% Imiprothrin 0.4% PBO | | 11.9 | 38.7 | 83.7 | 98.4 | 5.72 | 4.85-6.68 | 11.12 | 9.14-15.15 | 98.4 | 1.02 |
| Composition G 0.1% Transfluthrin 0.03% Imiprothrin | | 9.2 | 38.2 | 77.8 | 96.8 | 6.10 | 4.99-7.38 | 12.29 | 9.74-18.38 | 93.6 | 0.98 |
| Composition H 0.08% Transfluthrin 0.03% Imiprothrin | | 11.7 | 40.5 | 75.2 | 97.3 | 5.98 | 4.22-8.16 | 12.61 | 9.02-28.88 | 91.4 | 0.99 |
| Composition I 0.15% esbiothrin 0.04% transfluthrin 0.11% D-phenothrin | | 17.4 | 51.0 | 71.8 | 82.2 | 5.92 | 2.81-9.77 | 19.01 | 10.97-275.51 | 81.8 | 0.93 |

TABLE 4b-continued

Mean test results (% knockdown, KT50, KT90, % 24 h mortality, sprayed dose) of aerosol against *Musca domestica* in Peet-Grady Chamber.

| Test Composition | Test species | % knockdown after minutes | | | | KT50 in Minutes | 95% Confidence Limits of KT50 | KT90 in Minutes | 95% Confidence Limits of KT90 | % 24 Hours Mortality | Sprayed Dose in grams |
|---|---|---|---|---|---|---|---|---|---|---|---|
| | | 3 | 5 | 10 | 15 | | | | | | |
| Composition J 0.3% D-tetramethrin 0.1% permethrin 0.1% D-phenothrin | | 29.1 | 55.3 | 73.8 | 87.3 | 4.88 | 3.47-6.21 | 17.66 | 12.32-37.61 | 87.3 | 1.04 |

Method: Aerosol test method in Peet-Grady Chamber; Approximately 250 free flying mixed sex house flies per replicate TABLE 4c Mean test results (% knockdown, % 24 h mortality, sprayed dose) of aerosol against *Blattella germanica*, on Direct Spray test method.

| Test Composition | Test species | % knockdown after seconds | | | | | | | | | | % 24 Hours Mortality | Sprayed Dose in grams |
|---|---|---|---|---|---|---|---|---|---|---|---|---|---|
| | | 15 | 30 | 45 | 60 | 75 | 90 | 105 | 120 | 135 | 150 | | |
| Composition E 0.03% Prallethrin 0.03% Imiprothrin 0.1% Cypermethrin | *Blattella germanica* | 96.0 | 100.0 | 100.0 | 100.0 | 100.0 | 100.0 | 100.0 | 100.0 | 100.0 | 100.0 | 100.0 | 3.16 |
| Composition F 0.1% Transfluthrin 0.03% Imiprothrin 0.4% PBO | | 90.0 | 100.0 | 100.0 | 100.0 | 100.0 | 100.0 | 100.0 | 100.0 | 100.0 | 100.0 | 100.0 | 3.35 |
| Composition G 0.1% Transfluthrin 0.03% Imiprothrin | | 100.0 | 100.0 | 100.0 | 100.0 | 100.0 | 100.0 | 100.0 | 100.0 | 100.0 | 100.0 | 100.0 | 3.37 |
| Composition H 0.08% Transfluthrin 0.03% Imiprothrin | | 68.0 | 100.0 | 100.0 | 100.0 | 100.0 | 100.0 | 100.0 | 100.0 | 100.0 | 100.0 | 100.0 | 3.28 |
| Composition I 0.15% esbiothrin 0.04% transfluthrin 0.11% D-phenothrin | | 0.0 | 28.0 | 54.0 | 72.0 | 84.0 | 94.0 | 94.0 | 96.0 | 100.0 | 100.0 | 98.0 | 1.97 |
| Composition J 0.3% D-tetramethrin 0.1% permethrin 0.1% D-phenothrin | | 100.0 | 100.0 | 100.0 | 100.0 | 100.0 | 100.0 | 100.0 | 100.0 | 100.0 | 100.0 | 100.0 | 2.49 |

Method: Aerosol Direct Spray test method; 10 males *Blattella germanica* per replicate; Direct Spray time as 1.0 second TABLE 4d Mean test results (% knockdown, % 24 h mortality, sprayed dose) of aerosol against *Periplaneta americana* on Direct Spray test method.

| Test Composition | Test species | % knockdown after seconds | | | | | | | | | | % 24 Hours Mortality | Sprayed Dose in grams |
|---|---|---|---|---|---|---|---|---|---|---|---|---|---|
| | | 15 | 30 | 45 | 60 | 75 | 90 | 105 | 120 | 180 | 240 | 300 | | |
| Composition E 0.03% Prallethrin 0.03% Imiprothrin 0.1% Cypermethrin | *Periplaneta americana* | 56.0 | 88.0 | 100.0 | 100.0 | 100.0 | 100.0 | 100.0 | 100.0 | 100.0 | 100.0 | 100.0 | 100.0 | 3.20 |
| Composition F 0.1% Transfluthrin 0.03% Imiprothrin 0.4% PBO | | 40.0 | 84.0 | 100.0 | 100.0 | 100.0 | 100.0 | 100.0 | 100.0 | 100.0 | 100.0 | 100.0 | 100.0 | 3.09 |
| Composition G 0.1% Transfluthrin 0.03% Imiprothrin | | 52.0 | 72.0 | 100.0 | 100.0 | 100.0 | 100.0 | 100.0 | 100.0 | 100.0 | 100.0 | 100.0 | 100.0 | 3.28 |

TABLE 4d-continued

Mean test results (% knockdown, % 24 h mortality, sprayed dose) of aerosol against *Periplaneta americana* on
Direct Spray test method.

| Test Composition | Test species | % knockdown after seconds | | | | | | | | | | | % 24 Hours Mortality | Sprayed Dose in grams |
| | | 15 | 30 | 45 | 60 | 75 | 90 | 105 | 120 | 180 | 240 | 300 | | |
|---|---|---|---|---|---|---|---|---|---|---|---|---|---|---|
| Composition H 0.08% Transfluthrin 0.03% Imiprothrin | | 20.0 | 56.0 | 68.0 | 88.0 | 96.0 | 96.0 | 96.0 | 100.0 | 100.0 | 100.0 | 100.0 | 100.0 | 3.19 |
| Composition I 0.15% esbiothrin 0.04% transfluthrin 0.11% D-phenothrin | | 8.0 | 16.0 | 16.0 | 16.0 | 20.0 | 24.0 | 28.0 | 28.0 | 36.0 | 48.0 | 52.0 | 48.0 | 2.08 |
| Composition J 0.3% D-tetramethrin 0.1% permethrin 0.1% D-phenothrin | | 0.0 | 16.0 | 28.0 | 36.0 | 44.0 | 52.0 | 60.0 | 72.0 | 80.0 | 100.0 | 100.0 | 100.0 | 2.39 |

Method: Aerosol Direct Spray test method; 5 males *Periplaneta Americana* per replicate; Direct Spray time as 1.0 second

20

TABLE 4e

Mean test results (% knockdown, % 24 h mortality, sprayed dose) of aerosol against
*Musca domestica* on Direct Spray test method.

| Test Composition | Test species | % knockdown after seconds | | | | | | % 24 Hours Mortality | Sprayed Dose in grams |
| | | 10 | 20 | 30 | 40 | 50 | 60 | | |
|---|---|---|---|---|---|---|---|---|---|
| Composition E 0.03% Prallethrin 0.03% Imiprothrin 0.1% Cypermethrin | *Musca domestica* | 100.0 | 100.0 | 100.0 | 100.0 | 100.0 | 100.0 | 100.0 | 3.13 |
| Composition F 0.1% Transfluthrin 0.03% Imiprothrin 0.4% PBO | | 100.0 | 100.0 | 100.0 | 100.0 | 100.0 | 100.0 | 100.0 | 3.15 |
| Composition G 0.1% Transfluthrin 0.03% Imiprothrin | | 100.0 | 100.0 | 100.0 | 100.0 | 100.0 | 100.0 | 100.0 | 3.29 |
| Composition H 0.08% Transfluthrin 0.03% Imiprothrin | | 100.0 | 100.0 | 100.0 | 100.0 | 100.0 | 100.0 | 100.0 | 2.59 |
| Composition I 0.15% esbiothrin 0.04% transfluthrin 0.11% D-phenothrin | | 70.0 | 94.0 | 100.0 | 100.0 | 100.0 | 100.0 | 100.0 | 2.04 |
| Composition J 0.3% D-tetramethrin 0.1% permethrin 0.1% D-phenothrin | | 80.0 | 96.0 | 100.0 | 100.0 | 100.0 | 100.0 | 100.0 | 2.46 |

Method: Aerosol Direct Spray test method; 10 females *Musca domestica* per replicate Direct Spray time as 1.0 second

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. A composition for killing insects comprising:
an active ingredient comprising between about 0.05% to about 0.5% by weight of transfluthrin and between about 0.01% to about 0.5% by weight of imiprothrin, and
solvent;
wherein the active ingredient is devoid of residual kill agents, and
wherein the solvent comprises at least about 50% by weight water, based on a total weight of the composition.

2. The composition of claim 1, wherein the solvent comprises an alcohol.

3. The composition of claim 1, wherein the active ingredient is about 0.05% to about 1% by weight, based on a total weight of the composition.

4. The composition of claim 1, wherein the solvent is a polar, organic solvent.

5. The composition of claim 4, comprising about 0.5% to about 5.0% by weight polar, organic solvent, based on a total weight of the composition.

6. The composition of claim 1, further comprising a propellant.

7. The composition of claim 6, wherein the formula composition is such that the composition is discharged as a foam.

8. The composition of claim 1, wherein solvent comprises an alcohol and water.

9. The composition of claim 1, wherein the active ingredient comprises between about 0.08% to about 0.1% by weight of transfluthrin and between about 0.03% to about 0.05% by weight of imiprothrin.

10. The composition of claim 1, wherein the active ingredient comprises about 0.1% by weight of transfluthrin and about 0.05% by weight of imiprothrin.

* * * * *